Sept. 29, 1936.  F. H. RASMUSSEN  2,055,910
DISPLAY DEVICE
Filed May 7, 1934  4 Sheets-Sheet 1
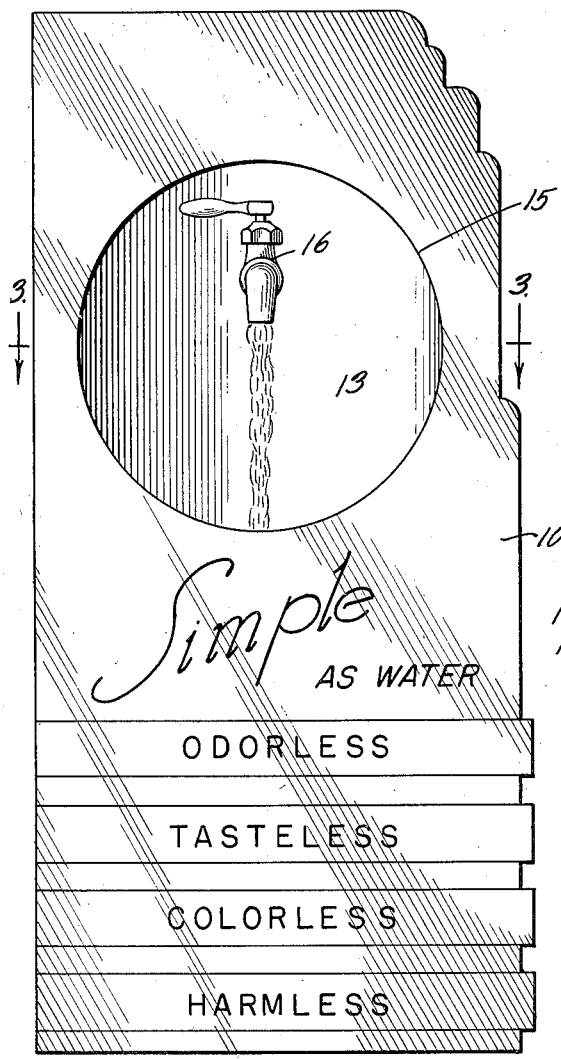
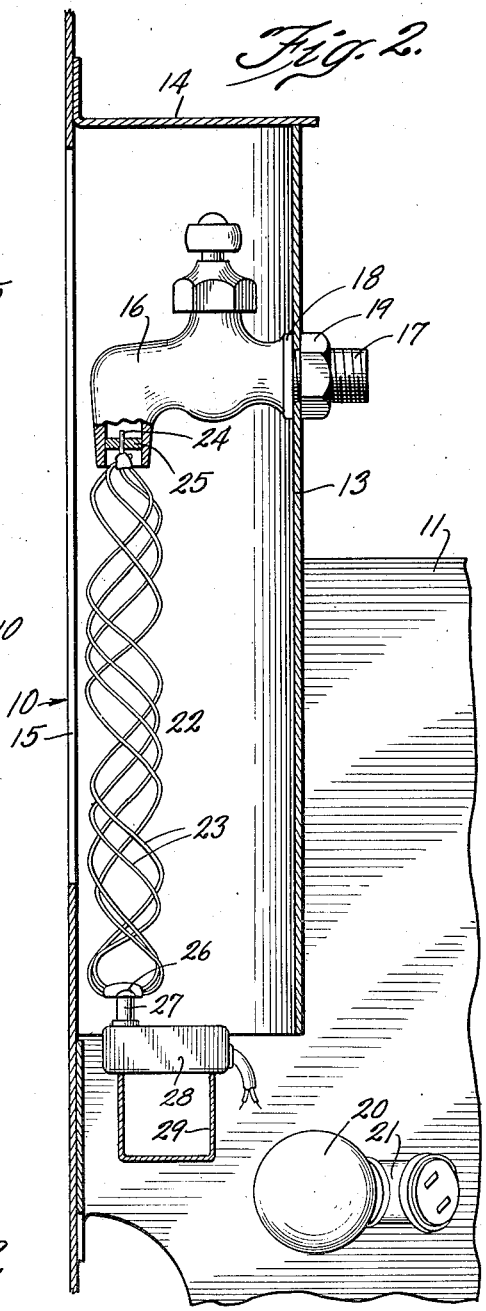
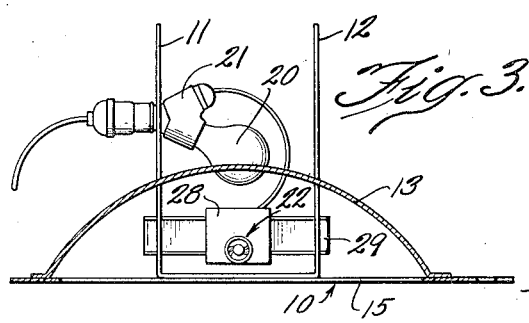
Inventor:
Frank H. Rasmussen

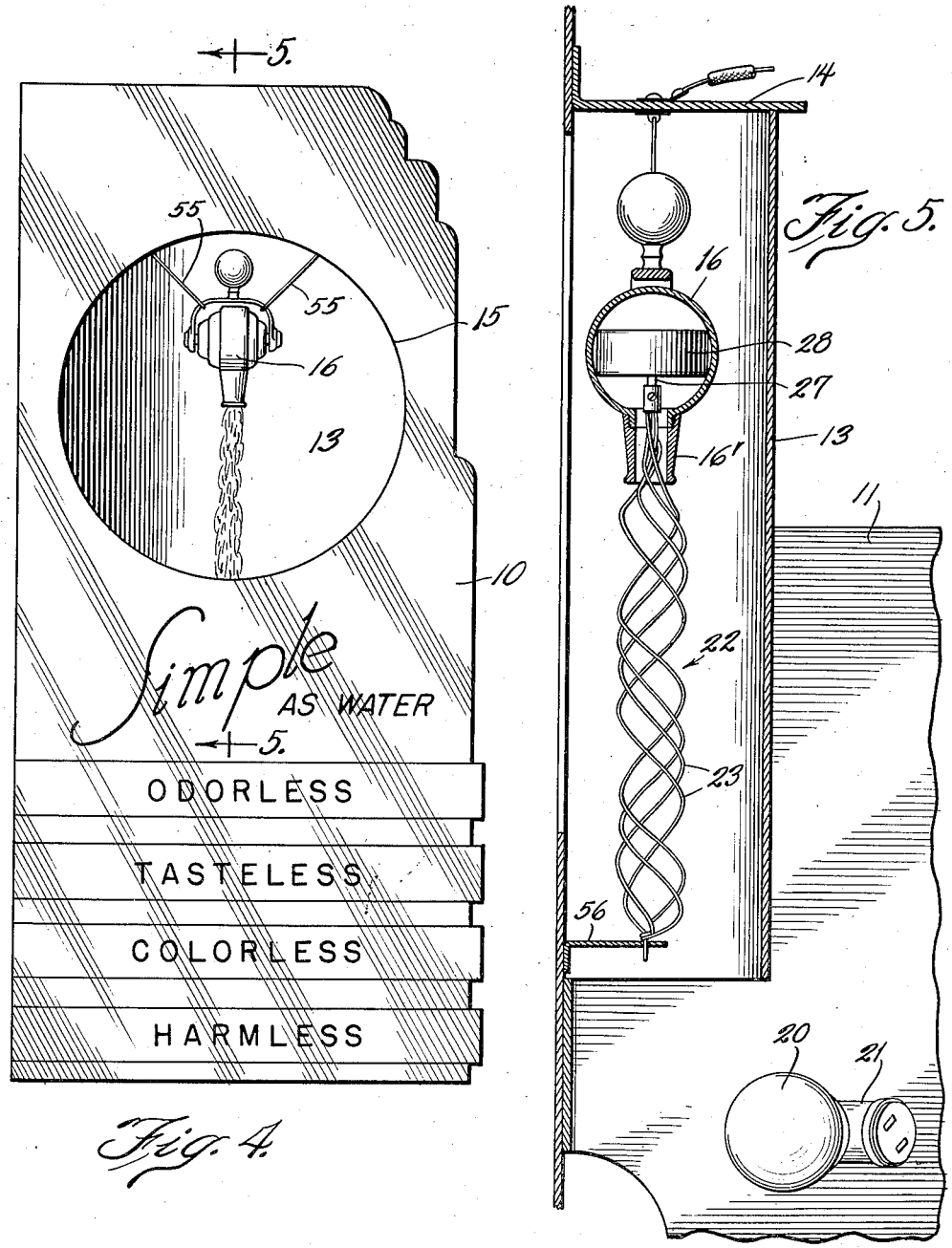

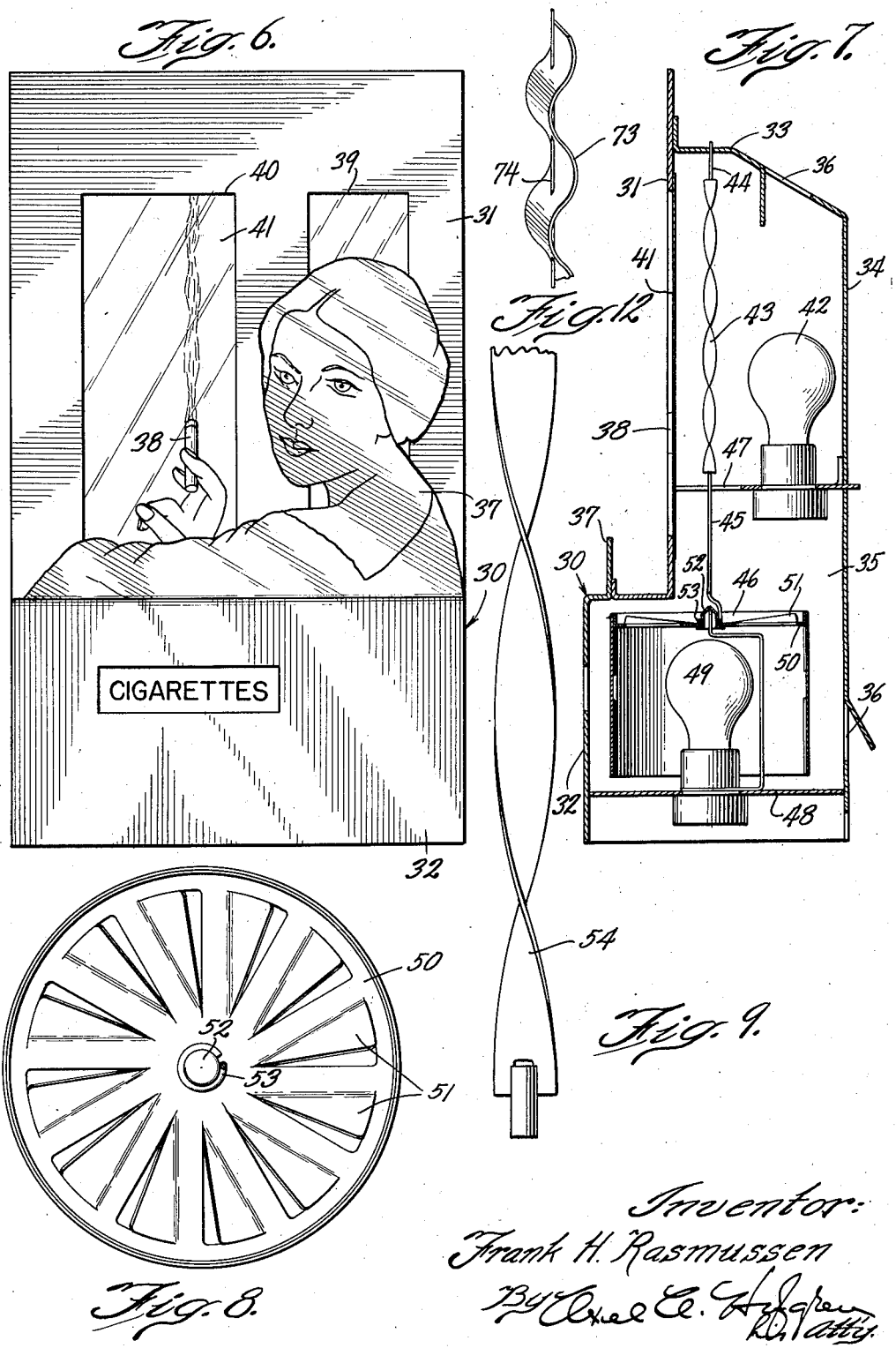

Sept. 29, 1936. F. H. RASMUSSEN 2,055,910
DISPLAY DEVICE
Filed May 7, 1934 4 Sheets-Sheet 4

Inventor:
Frank H. Rasmussen

Patented Sept. 29, 1936

2,055,910

UNITED STATES PATENT OFFICE 2,055,910

DISPLAY DEVICE

Frank H. Rasmussen, Chicago, Ill., assignor to Magill-Weinsheimer Company, Chicago, Ill., a corporation of Illinois Application May 7, 1934, Serial No. 724,248

11 Claims. (Cl. 40—126)

The invention relates in general to an advertising display device and more particularly to that type of advertising device in which an action scene is depicted.

An object of the invention is to provide a novel display device which attracts attention because of simulated action, the manner of production of which arouses the curiosity of the observer.

More particularly it is an object of the invention to provide a novel means for simulating to a high degree of reality the flow or movement of a fluid or for simulating a flame.

Another object is to effect such simulation of action by a simple, inexpensive device which is not subject to become out of order, and which is not costly to operate.

Other objects and advantages will become apparent from the following detailed description taken in connection with the accompanying drawings, in which:

Fig. 1 is a front elevational view of an advertising display device embodying the features of the invention and simulating the flow of a transparent fluid such as water.

Fig. 2 is an enlarged fragmental, vertical sectional view of the device shown in Fig. 1, taken approximately along the vertical center line and looking from the right in that figure.

Fig. 3 is a sectional view taken along the line 3—3 of Fig. 1.

Fig. 4 is a front elevational view of the advertising display device of Fig. 1 showing a modified arrangement of the construction.

Fig. 5 is a vertical sectional view taken along line 5—5 of Fig. 4.

Fig. 6 is a front elevational view of a modified form of display device in which a somewhat opaque fluid, such as smoke, is simulated.

Fig. 7 is a vertical sectional view of the device shown in Fig. 4, taken approximately along the center line and looking from the right in that figure.

Fig. 8 is an enlarged fragmentary view of the rotary element of the heat motor.

Fig. 9 is an enlarged fragmentary view of a modified form of rotating element.

Fig. 12 is a perspective view of another modified form of rotating element.

Figures 10, 11:
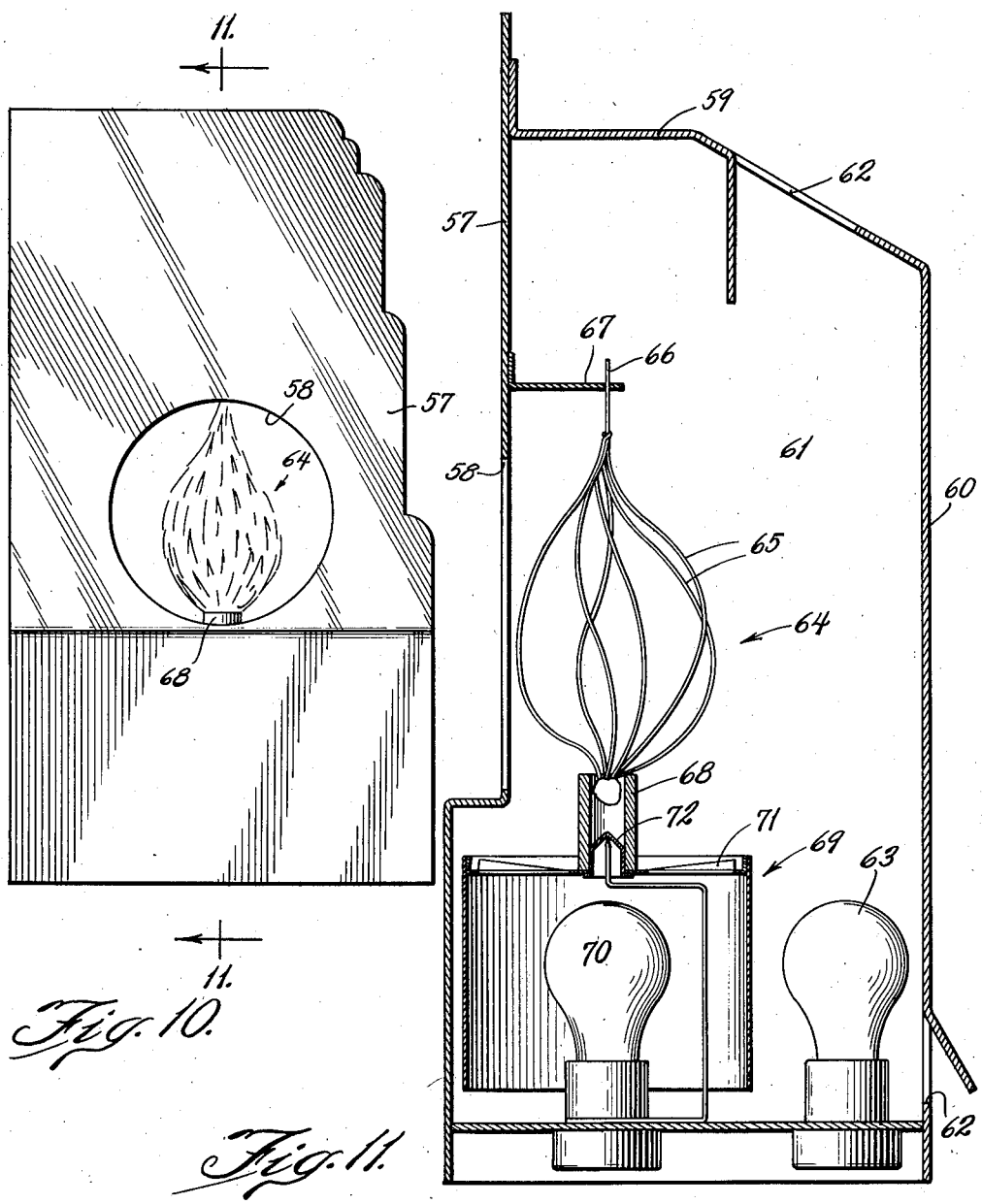
Fig. 10 is a front elevational view of a modified form of display device in which a flame, such as that of a Bunsen burner, is simulated.
Fig. 11 is a vertical sectional view taken along line 10—10 of Fig. 9.

While the display device forming the subject of the invention is capable of modification to adapt it for a variety of different conditions and uses without departing from the spirit and scope of the invention as defined by the appended claims, it is, for purposes of disclosure, here shown and will be described hereinafter as embodied in a display designed for use in a store window.

To render the advertising display unusually effective in attracting the attention of a passerby, it includes an action scene and particularly simulates action that could not actually take place under the circumstances, thereby arousing the curiosity of the passerby and causing prolonged and careful observation, and a vivid impression of the display. The action simulated may take a variety of forms and may be that of various objects. Herein, by way of illustration, the action simulated is the flow of movement of a fluid and the reproduction of a flame. This is effected by modifying in a predetermined manner and in repeated succession the light rays reaching the observer from the display device.

In Figs. 1 to 5 of the drawings, the invention is illustrated as embodied in a display device in which modification of the light rays for the purpose of simulating action is effected in large part by reflection. The display comprises a front, vertical panel 10 supported in upright position by spaced parallel plates 11 and 12 secured to the rear of the panel and extending perpendicularly thereto. Also secured to the rear of the panel 10 and partially supported by the plates 11 and 12, cut away at their front edges to receive it, is an elongated, arcuate plate 13. The plate 13 extends over the upper portion of the panel 10 and with a cover 14 completes the body structure of the display device.

The lower portion of the panel 10 is adapted to carry advertising matter, while the upper portion is formed with a large opening 15 through which the action scene is visible. In the present instance, the action simulated is that of irregularly flowing water. To heighten the illusion, a faucet 16 is mounted to be visible through the opening 15.

As previously stated the simulation of action is effected by modifying in repeated succession light rays from the display device. Preferably the light rays originate in the display device itself. Accordingly an electric light bulb 20 is located rearwardly of the panel 10 and below the arcuate plate 13 so that the rays from the bulb may pass upwardly through the open lower end of the arcuate plate and the opening 15. The bulb 20, however, is not visible by an observer of the display and is conveniently supported in a two-way socket 21 mounted on the side plate 11.

Positioned where it is visible through the opening 15, is an elongated reflecting member 22 for modifying the rays of the bulb 20 to simulate water flowing in an irregular and perturbed stream from the faucet 16. In order that the simulated stream may be transparent, as is a stream of water, the member 22 is of open construction composed of a plurality of polished wires 23 each bent into a helix. Herein four wires are employed secured together at their ends and twisted in pairs like a left-hand thread, the pairs being approximately 180° apart.

To modify the light rays in repeated succession, the member 22 is rotated and for that purpose has an engagement with the end of a shaft 27 of an electric motor 28. It will be seen that during each revolution of the member 22 each convolution of each wire will be struck by the light rays at a constantly varying angle, and thus modify the rays in a constantly varying but definite manner. This definite variation is repeated with each revolution of the member. Preferably the member 22 is rotated at approximately 60 R. P. M. With the member thus rotated in the rays of the light 20, the polished helical wires simulate the flow of water in a striking manner. The convolutions of the rotating wires produce a wavy, pulsating effect which is present in the perturbed flow of water from a faucet. The gleam of light-struck water also is present, and the speed of rotation is slow enough to maintain a transparent appearance of the stream.

In Figures 1 to 3 of the drawings, the faucet 16 is shown mounted on the arcuate plate 13 and may be secured simply by projecting a threaded nipple 17 of the faucet through the plate 13 and clamping the plate between a shoulder 18 on the faucet and a nut 19 threaded onto the nipple. For supporting the member 22 one of the wires composing the member projects beyond the upper end thereof to form a shaft 24 journaled in a disk 25 wedged in the mouth of the faucet 16. At its lower end the member 22 carries a recessed clip 26 which rests upon and frictionally engages the end of the shaft 27 of the motor 28 which is here mounted below the lower edge of the opening 15 on a cross member 29 secured in the plates 11 and 12. The motor may be of any well known construction operating on 110 volts and is electrically connected to a source of energy through the socket 21.

Figures 4 and 5 show a modified arrangement of the construction shown in Figs. 1 to 3. In Figs. 4 and 5 the faucet 16 is of a type, such as a soda dispensing nozzle, having a large chamber within it and is suspended from the cover 14 by cords 55. Housed within the faucet 16 is the motor 28 disposed with its shaft 27 concentric of the nozzle 16' of the faucet for connection with the upper end of the member 22 which extends into the nozzle. The lower end of the member 22 is preferably journaled in a bracket 56 secured to the panel 10. With the faucet suspended in mid air, an observer can see that there is no connection to a source of supply and thus the display arouses a great deal of curiosity and prolonged observation in an attempt to discover how the effect is produced.

In the form of display device shown in Figs. 6 to 9, modification of the light rays is effected by interruption or interception of the rays. More particularly rising smoke is simulated for the purpose of advertising cigarettes or the like. The body of the display device is formed by a casing 30 having a front vertical panel with an upper portion 31 offset rearwardly from the lower portion 32. Top, rear and side walls 33, 34 and 35, respectively, complete the casing. Apertures 36 are formed in the rear and top wall to permit flow of air through the casing and the lower panel portion 32 carries a figure 37 holding what appears to be a lighted cigarette 38. The lighted end of the cigarette is preferably in the plane of the portion 31 for a reason that will appear presently.

The upper panel portion 31 is formed with two openings 39 and 40, the latter being opposite the cigarette 38. To simulate smoke rising from the cigarette 38, the opening 40 is covered with a sheet 41 of translucent paper. Placed directly back of the opening is an electric light bulb 42, the rays of which are diffused by the translucent paper 41, and interposed between the bulb 42 and the sheet 41 is an elongated, vertical, light-modifying member. This member is opaque in order to intercept the rays from the bulb 42 and is positioned so that its shadow is in vertical alinement with the end of the cigarette.

Herein the member is a cardboard strip 43 twisted to form a screw or vane, the edges of which are helical. The strip 43 is equipped at its upper end with a shaft 44 journaled in the top wall 33, and at its lower end, with a shaft 45 engaging a motor 46 for rotating the strip. Here again it will be seen that during each revolution of the strip 43 the shadow cast thereby on the sheet 41 will vary and that the same variation is repeated with successive revolutions. The twisted vane shape of the strip causes the shadow to expand and contract, thus simulating the wavy movement of smoke, while the translucent sheet blurs the shadow to give the bluish-grey color of smoke.

The bulb 42 is mounted on a cross member 47 and the motor 46 is likewise mounted on a member 48. The motor 46 is here shown as a heat motor of the type in which the heat from an electric bulb 49 causes rising air currents which act upon a rotatably mounted plate 50 formed with radial vanes 51. At its center the plate carries a hub 52 encircled by a ring 53 formed on the lower end of the shaft 45.

Figures 10 and 11 show another form of display device in which modification of light rays by reflection is employed to simulate action, the construction herein being such that a flame, such as the blue flame of a Bunsen burner, is simulated. The body of the display device may take any form and is herein shown generally similar to that of Figs. 6 and 7 having a front panel 57 with a circular aperture 58 therein and top, rear and side walls 59, 60, and 61 respectively. Apertures 62 may be formed in the top and rear walls to permit a flow of air through the body.

As previously stated the simulation of action is effected by modifying in repeated succession light rays from the display device, reflection of the rays being here employed. Preferably the light rays originate within the display device. Accordingly an electric light bulb 63 is located rearwardly of the panel 57 and below the circular opening 58 so that the rays may pass upwardly through the opening but so that the bulb is at least partially hidden from the view of an observer of the display device.

Positioned where it is visible through the opening 58 is the reflecting member 64 which, for the purpose of simulating a Bunsen burner flame, has the general shape of an inverted plumb-bob. The member 64 is of open construction composed of a plurality of wires 65, six being here shown, secured together at their ends and diverging rapidly radially outwardly and laterally from the base of the member and then converging gradually to a point, each wire being bent into a sinuous shape in the surface of the member. The wires are covered with a blue glazed enamel of the shade of the Bunsen burner flame. At the upper end, one of the wires projects to form a shaft 66 journaled in a bracket 67 mounted on the rear of the panel 57 while at the lower end the wires 65 are secured together and supported in a tube 68.

The member 65 may be rotated by any means such as the heat motor 69 shown herein. The motor comprises a heat source such as a bulb 70 positioned below a rotary, air current driven element 71 formed at its center with a hub 72 received within the tube 68. The tube 68 is of a diameter approximately that of an average sized Bunsen burner and of a length such that the upper end projects a short distance above the lower edge of the opening 58 so that the source of the simulated flame is visible to an observer of the display.

Rotation of the member 65 by the heat motor 69 will cause the rays from the light 63 to be modified in predetermined succession which with the bluish hue added by the coloring of the wires, results in a striking resemblance of the blue flame of a Bunsen burner.

It is believed apparent from the foregoing description that the invention is not limited to the simulation of water, smoke or flame, but may be modified to simulate numerous things. This may be done readily by interchanging the cardboard strip 43 for the wire members 22 or 65, or by substituting a member of different shape or construction. In Fig. 9 there is illustrated a rotating element 54 which is twisted in form similar to the strip 43. An element such as 54 may be of metal or other material and either polished or colored, the exterior surface being properly selected so as to simulate the desired fluid. For example, when such an element is used in the manner shown in Figs. 1 to 3, it may be enameled white to to give a simulation of milk.

The invention lends itself readily to different forms and uses, it being readily apparent that by rotating an element such as 22, in Figs. 1 to 3, in one direction it will give an effect of water running out of the faucet, whereas if rotated in the opposite direction it will give the effect of a fluid moving upwardly. Thus, in the embodiments illustrated herein, the rotating elements in the forms shown in Figs. 1 to 5 would be rotated in the opposite direction from that shown in Figs. 6, 7, 10 and 11.

Fig. 12 shows a modified form of rotating element which may be constructed in a highly economical manner. The element comprises simply a narrow strip 73 of any desired material given a sinuous wave. A rod 74 is preferably threaded through the strip to provide support therefor should it be of a material without sufficient rigidity to support itself.

I claim as my invention:

1. An advertising display device including an action simulating scene comprising a panel for carrying advertising matter, said panel having an opening therein, a source of light located rearwardly of said panel, an object representing the source of the action simulated disposed rearwardly of said panel and in front of said source of light, and a member having a successively repeated uniform movement positioned rearwardly of the panel and between the source of light and the observer of the display to modify in a predetermined manner the light from said source reaching the observer, one end of said member engaging said object so that the simulated action appears to emanate from the object representing the source of the action.

2. In an advertising display, means for simulating an action scene comprising a source of light concealed from the observer of the display device and a rotary plural wire member of open construction exposed to the direct view of the observer of the display device and interposed between the source of light and the observer of the display device operating to modify in a successively repeated manner the rays of light from said source reaching the observer.

3. An advertising display device simulating the flow of a colorless, transparent liquid comprising a front panel for carrying advertising matter, a source of light positioned rearwardly of the panel and concealed from the observer of the display device, a plurality of highly polished wires each bent in the form of a helix and united to form a unitary member, said member being exposed to the light source and to the view of the observer, and means rotating said member about the axis of the helix.

4. An advertising display device simulating the irregular flow of water comprising a front panel for carrying advertising matter, a faucet exposed to the view of the observer of the display device, a source of light concealed from the observer, a vertically disposed rotatable member journaled at its upper end in the mouth of said faucet and composed of a plurality of polished wires bent into the form of a helix, said member being exposed to said source of light and to the view of the observer, and means also concealed from the observer for rotating said member.

5. An advertising display device for advertising cigarettes comprising a front panel having an opening therein, advertising matter carried by said panel including the representation of a lighted cigarette with the lighted end positioned near the plane of the opening in the panel, a translucent sheet of material mounted over said opening, a source of light positioned in back of said sheet, an elongated strip of opaque material twisted to form a helix and mounted in vertical position intermediate said light and said sheet so that the shadow of the strip is in alinement with the end of the cigarette, and means for rotating the strip.

6. An advertising display device including means simulating a Bunsen burner flame comprising a front panel for carrying advertising matter, said panel having an aperture therethrough, a source of light positioned rearwardly of the panel and concealed from an observer of the display device, a reflecting member positioned to be viewed through the aperture in the panel and exposed to the light source, said member being composed of a plurality of wires of bluish hue secured together at their ends and bent to outline a member of generally plumb-bob shape disposed with the point upward, a tube resembling a burner supporting the member and projecting into the aperture, and means for rotating said member about its axis.

7. An advertising display device simulating a Bunsen burner flame comprising a front panel for carrying advertising matter, a source of light positioned rearwardly of the panel and concealed from the observer of the display device, a plurality of reflecting wires secured together at their ends and bent to form a member having a general plumb-bob shape, said member being exposed to the light source and to the view of the observer, and means rotating said member about its axis.

8. An advertising display device including an action scene simulating a flame or flowing fluid comprising a panel for carrying advertising matter having an unobstructed opening therein, a source of light located rearwardly of said panel, an object representing the source of the action simulated clearly visible through the opening, and an open construction reflecting member clearly visible through the opening having a successively repeated movement and interposed between the source of light and an observer of the display to modify in a predetermined manner the light reaching the observer, said light being disposed outwardly of the opening in a plane passing through the axis of the member and at right angles to the panel and said member being positioned so that the simulated action appears to emanate from the object representing the source.

9. An advertising display device comprising a supporting structure including a front vertical panel having an aperture therethrough and means simulating the flow of water comprising a faucet suspended rearwardly of the panel in a position to be viewed through the aperture, a motor housed in the faucet, a rotatable reflecting member composed of a plurality of polished wires projecting from the faucet, said member being connected to said motor to be rotated thereby, and a light source located rearwardly of the panel out of the line of vision of an observer of the display and illuminating the reflecting member.

10. An advertising display device simulating an action scene comprising a front panel for carrying advertising matter, said panel having an opening therein, a source of light located rearwardly of said panel to one side of the opening therein so that no direct rays from said source reach the observer of the display device, and a member positioned behind and visible through the opening interposed between the source of light and the observer of the display device modifying in a successively repeated manner the rays of light from said source striking said member and visible to the observer.

11. An advertising display device simulating the flow or movement of a fluid comprising a front panel for carrying advertising matter, said panel having an opening therein transmitting light of the same color over its entire area, a source of light located rearwardly of said panel, an object representing the source of the fluid simulated, and a rotating member having an irregular outline interposed between the source of light and the observer of the display to modify the rays of light emanating from said source and striking said member, said member being located rearwardly of the panel and positioned so as to appear as emanating from the object representing the source of fluid.

FRANK H. RASMUSSEN.